(12) United States Patent
Honig

(10) Patent No.: US 7,136,960 B2
(45) Date of Patent: Nov. 14, 2006

(54) HARDWARE HASHING OF AN INPUT OF A CONTENT ADDRESSABLE MEMORY (CAM) TO EMULATE A WIDER CAM

(75) Inventor: David Honig, Irvine, CA (US)

(73) Assignee: Integrated Device Technology, Inc., San Jose, CA (US)

( * ) Notice: Subject to any disclaimer, the term of this patent is extended or adjusted under 35 U.S.C. 154(b) by 302 days.

(21) Appl. No.: 10/173,516

(22) Filed: Jun. 14, 2002

(65) Prior Publication Data

US 2003/0233515 A1 Dec. 18, 2003

(51) Int. Cl.
*G06F 12/04* (2006.01)
*H04L 9/14* (2006.01)

(52) U.S. Cl. .................. 711/108; 711/216; 713/153

(58) Field of Classification Search ............. 711/108, 711/216; 709/238; 370/395.3, 395.31, 395.32; 713/153; 365/49
See application file for complete search history.

(56) References Cited

U.S. PATENT DOCUMENTS

| | | | |
|---|---|---|---|
| 4,056,845 A | 11/1977 | Churchill, Jr. | |
| 5,339,076 A | 8/1994 | Jiang | |
| 5,339,398 A | 8/1994 | Shah et al. | |
| 5,822,321 A * | 10/1998 | Petersen et al. | 370/474 |
| 5,838,264 A | 11/1998 | Cooper | |
| 5,920,900 A | 7/1999 | Poole et al. | |
| 5,930,359 A | 7/1999 | Kempke et al. | |
| 6,226,710 B1 | 5/2001 | Melchior | |
| 6,560,337 B1 * | 5/2003 | Peyravian et al. | 380/44 |
| 6,622,168 B1 | 9/2003 | Datta | |
| 6,631,419 B1 * | 10/2003 | Greene | 709/238 |
| 6,697,276 B1 * | 2/2004 | Pereira et al. | 365/49 |
| 6,708,250 B1 | 3/2004 | Gillingham | |
| 6,715,029 B1 * | 3/2004 | Trainin et al. | 711/108 |
| 6,748,484 B1 | 6/2004 | Henderson et al. | |
| 6,754,800 B1 | 6/2004 | Wong et al. | |
| 6,763,426 B1 | 7/2004 | James et al. | |
| 6,889,225 B1 | 5/2005 | Cheng et al. | |
| 6,892,237 B1 | 5/2005 | Gai et al. | |
| 2002/0094084 A1 * | 7/2002 | Wasilewski et al. | 380/241 |
| 2002/0161969 A1 | 10/2002 | Nataraj et al. | |
| 2002/0178341 A1 | 11/2002 | Frank | |
| 2003/0012198 A1 * | 1/2003 | Kaganoi et al. | 370/392 |
| 2003/0037055 A1 * | 2/2003 | Cheng et al. | 707/100 |
| 2003/0188089 A1 * | 10/2003 | Perloff | 711/108 |

OTHER PUBLICATIONS

"IPv4," http://en.wikipedia.org/wiki/IPv4, pp. 104.*

(Continued)

*Primary Examiner*—Hong Chong Kim
*Assistant Examiner*—Shane M. Thomas
(74) *Attorney, Agent, or Firm*—Bever, Hoffman & Harms

(57) ABSTRACT

An integrated circuit chip is provided having a port for receiving a character string. A hardware hashing circuit on the integrated circuit chip is configured to perform a hashing function on the character string, thereby creating a hashed output value. A binary content addressable memory (CAM) array on the integrated circuit chip is coupled to receive the hashed output value. The binary CAM array provides an index value in response to the hashed output value if the hashed output value matches an entry of the binary CAM array. In a particular embodiment, the hardware hashing circuit can be configured to process character strings having different lengths (greater than the width of the binary CAM array) in response to one or more configuration bits. The hardware hashing circuit can include, an input register, Data Encryption Standard (DES) circuitry and exclusive OR circuitry.

27 Claims, 11 Drawing Sheets

OTHER PUBLICATIONS

"IPv6," http://en.wikipedia.org/wiki/IPv6, pp. 1-9.*

Fielding et al., "Hypertext Transfer Protocol," published 1999, p. 25.

IBM Tech. Disc. Bulletin, "Improved Caching on Net Commerce Pages," published May 2001, Issue 445, p. 863.

* cited by examiner

HARDWARE HASHING OF AN INPUT OF A CONTENT ADDRESSABLE MEMORY (CAM) TO EMULATE A WIDER CAM

RELATED APPLICATIONS

The present application is related to U.S. patent application Ser. No. 10/173,206, by David A. Honig, entitled "Use of Hashed Content Addressable Memory (CAM) to Accelerate Content-Aware Searches".

BACKGROUND OF THE INVENTION

1. Field of the Invention

The present invention relates to a method and apparatus for using a hardware hashing circuit to hash the input of a content addressable memory (CAM) array, thereby emulating a wider CAM array.

2. Related Art

Networking equipment (e.g., Internet routers) typically receive packets that include flow-based character strings, which identify the manner in which the associated packets should be routed. One example of such a flow-based character string includes a source IP address, a source port, a destination IP address and a destination port. In accordance with the IPv4 protocol, this flow-based character string has a length of 96-bits. In accordance with the Ipv6 protocol, this flow-based character string would have a length of 288-bits. Networking equipment also typically stores a reference list of flow-based character strings, along with corresponding routing information indicating the manner in which the packets are to be routed. Upon receiving a flow-based character string, the networking equipment must search its reference list of flow-based character strings in order to determine whether the received flow-based character string matches one of the flow-based character strings stored in the reference list. Upon matching the received flow-based character string with a flow-based character string stored in the reference list, the networking equipment is able to retrieve routing information associated with the received flow-based character string, and use this routing information to forward the associated packet. It is therefore desirable to be able perform a search for long character strings within networking equipment. It is also desirable for these searches to be completed as quickly as possible.

One conventional search method is to search data organized in a binary tree in a serial manner. However, if a million entries are organized in a binary tree, then recognizing a particular entry would take at least $\log_2(10^6)$ steps (i.e., 20 steps). Thus, such a search method is relatively slow.

Another conventional search method is to search using a content addressable memory (CAM) array. However, CAM arrays typically have a relatively small width. For example, a conventional CAM array may have a width of 72-bits. This width is not large enough to accommodate all required searches. Thus, some CAM arrays are configured to store a single character string in a plurality of entries in the CAM array, thereby emulating a wider CAM array. For example, a CAM array having a width of 72-bits may store a character string having a width of 576-bits data in eight different entries of the CAM array (72×8=576). In this case, a 576-bit character string would be divided into eight 72-bit strings, and each of these eight 72-bit strings would have to be compared with the contents of the CAM array in order to detect a match. However, searching a plurality of entries causes this search method to be relatively slow. Moreover, storing a single character string in a plurality of entries of the CAM array effectively reduces the depth of the CAM array (because fewer character strings can be stored in this manner).

It would therefore be desirable to have a method and apparatus for using a CAM array to emulate a relatively wide CAM array, without reducing the operating speed of the CAM array, or reducing the effective depth of the CAM array.

SUMMARY

Accordingly, the present invention provides a system that includes a hardware hashing circuit that receives relatively long input character strings, and in response, provides relatively short hashed output values, which are provided to a binary CAM array. In one embodiment, the hashed output values have a width that is equal to the width of the binary CAM array. As a result, the binary CAM array effectively operates in response to the relatively long input character strings, thereby enabling the binary CAM array to emulate a relatively wide CAM array.

In one embodiment, the system further includes a configuration bus for providing configuration bits to the hardware hashing circuit, wherein the hardware hashing circuit is configured in response to the configuration bits. The configuration bits can be provided to the configuration bus by a configuration register located on the same chip as the hardware hashing circuit, or by an external controller. The hardware hashing circuit is configured to process character strings having different lengths in response to the configuration bits. For example, the hardware hashing circuit can be configured to process character strings having lengths of 72-bits, 144-bits, 288-bits or 576-bits in response to the configuration bits.

In a particular embodiment, the hardware hashing circuit comprises a plurality of Data Encryption Standard (DES) circuits, which are selectively coupled to receive the input character string in response to the configuration bits. The DES circuits provided hashed values, which are selectively provided to exclusive OR circuits in response to the configuration bits. The exclusive OR circuits combine the hashed values provided by the DES circuits, thereby providing the hashed output value.

The binary CAM array provides an index value in response to the hashed output value. The index value is used to look up data (e.g., routing information) associated with the input character string.

The present invention will be more fully understood in view of the following description and drawings.

DETAILED DESCRIPTION

Figure 1:
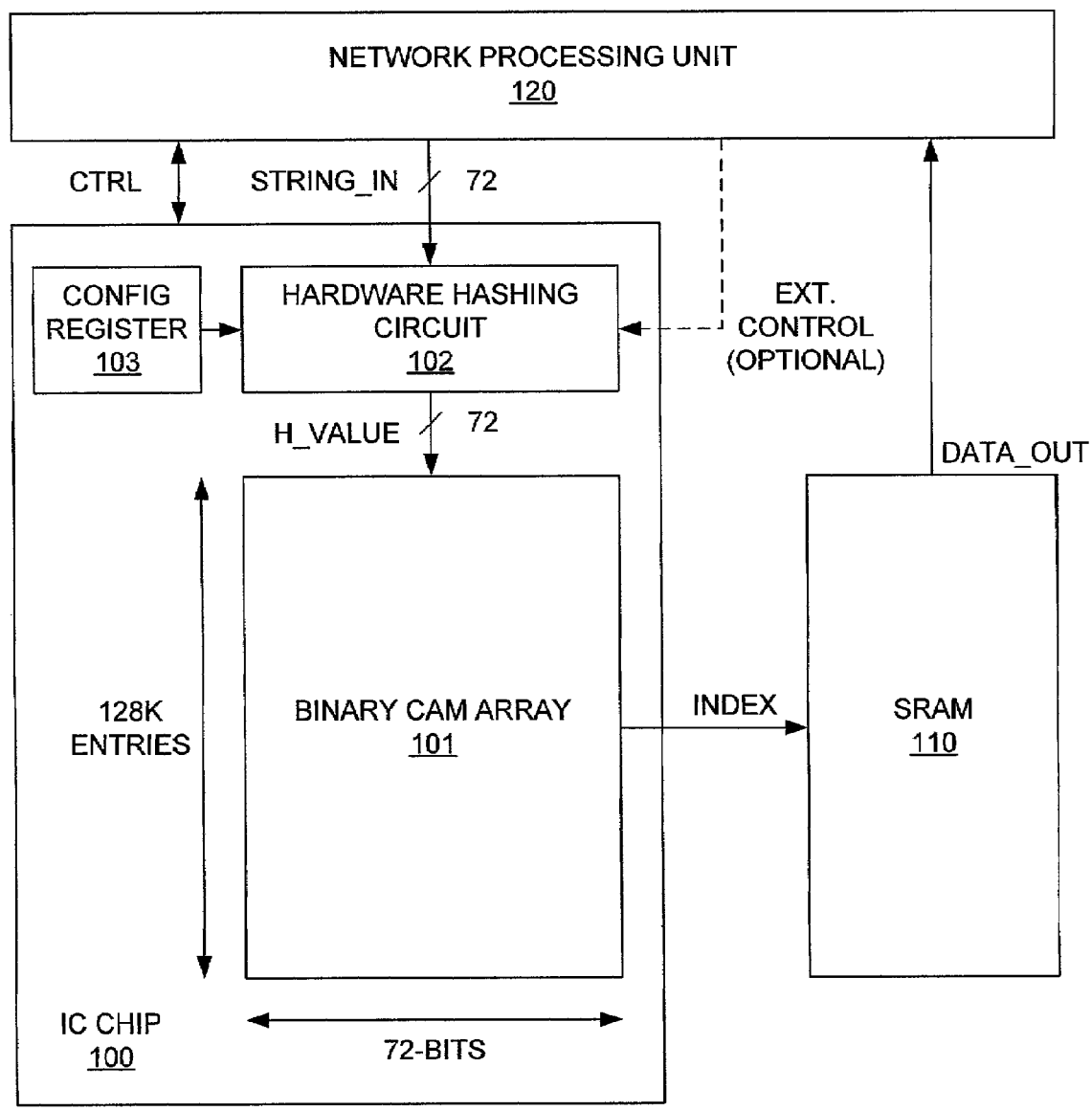
FIG. 1 is a block diagram of a system that includes an integrated circuit (IC) chip, a static random access memory (SRAM) and a network processing unit (NPU), in accordance with one embodiment of the present invention.

FIG. 1 is a block diagram of a system that includes integrated circuit (IC) chip 100, static random access memory (SRAM) 110 and network processing unit (NPU) 120, in accordance with one embodiment of the present invention. IC chip 100 includes CAM array 101, hardware hashing circuit 102, and configuration register 103, in accordance with one embodiment of the present invention. In the described embodiment, CAM array 101 is a conventional binary CAM array having a width of 72-bits and a depth of 128K entries. A binary CAM array, such as binary CAM array 101, is typically located on an IC chip (hereinafter referred to as a binary CAM chip), without hardware hashing circuit 102 and configuration register 103. Hardware hashing circuit 102 and configuration register 103 can be added to a conventional binary CAM chip, without significantly increasing the number of pins required on the chip. Moreover, the required layout area of hardware hashing circuit 102 and configuration register 103 is relatively small compared to the required layout area of binary CAM array 101, such that these additional elements 102–103 do not significantly increase the size of a conventional binary CAM chip. In some cases, hardware hashing circuit 102 and configuration register 103 may be small enough to fit in unused areas of a conventional binary CAM chip, such that these elements 102–103 do not increase the size of the conventional binary CAM chip at all.

In the described embodiment, IC chip 100 is capable of processing input character strings (STRING_IN) having widths of 72-bits, 144-bits, 288-bits or 576-bits, by hashing these character strings to 72-bit hashed input values (H_VALUE). However, other widths can be accommodated in other embodiments.

In general, hashing is the transformation of a string of characters into a shorter fixed-length value that represents the original string. In accordance with the described embodiments, hashing is used to transform the relatively long input character string STRING_IN to a relatively short, hashed input value H_VALUE. In the described embodiment, the hashed input value H_VALUE has a fixed length of 72-bits, which corresponds with the width of binary CAM array 101.

Configuration register 103 is programmed to store a pair of configuration bits, which are used to determine which one of the four character string widths is currently being implemented by IC chip 100. Configuration register 103 provides these configuration bits to hardware hashing circuit 102 on a configuration bus. In response, hardware hashing circuit 102 is configured in one of four corresponding configurations, as described in more detail below. In an alternate embodiment, the configuration bits are provided to hardware hashing circuit 102 by NPU 120, thereby rendering configuration register 103 unnecessary.

If configuration register 103 stores configuration bits having a value of "00", then hardware hashing circuit 102 is bypassed. Thus, the 72-bit input character string STRING_IN is passed directly to binary CAM array 101 as the 72-bit input value H_VALUE. Binary CAM array 101 operates as a conventional binary CAM array in this mode, providing an INDEX value to SRAM 110 in response to the hashed input value H_VALUE.

If configuration register 103 stores configuration bits having a value of "01", then hardware hashing circuit 102 is configured to process 144-bit wide input character strings. Each 144-bit input character string is provided as a pair of 72-bit input character strings, STRING_IN. As described in more detail below, the two 72-bit input character strings are loaded into a wide register in hardware hashing circuit 102. Hardware hashing circuit 102 then performs a hashing operation on the 144-bit input character string, thereby creating a 72-bit hashed input value (H_VALUE), which is applied to binary CAM array 101.

If configuration register 103 stores configuration bits having a value of "10", then hardware hashing circuit 102 is configured to process 288-bit wide input character strings. Each 288-bit input character string is provided as four 72-bit input character strings, STRING_IN. As described in more detail below, the four 72-bit input character strings are loaded into a wide register in hardware hashing circuit 102. Hardware hashing circuit 102 performs a hashing operation on the 288-bit input character string, thereby creating a 72-bit hashed input value (H_VALUE), which is applied to binary CAM array 101.

Finally, if configuration register 103 stores configuration bits having a value of "11", then hardware hashing circuit 102 is configured to process 576-bit wide input character string. Each 576-bit input character string is provided as eight 72-bit input character strings, STRING_IN. As described in more detail below, the eight 72-bit input character strings are loaded into a wide register in hardware hashing circuit 102. Hardware hashing circuit 102 performs a hashing operation on the 576-bit input character string, thereby creating a 72-bit hashed input value (H_VALUE), which is applied to binary CAM array 101.

Figure 2:
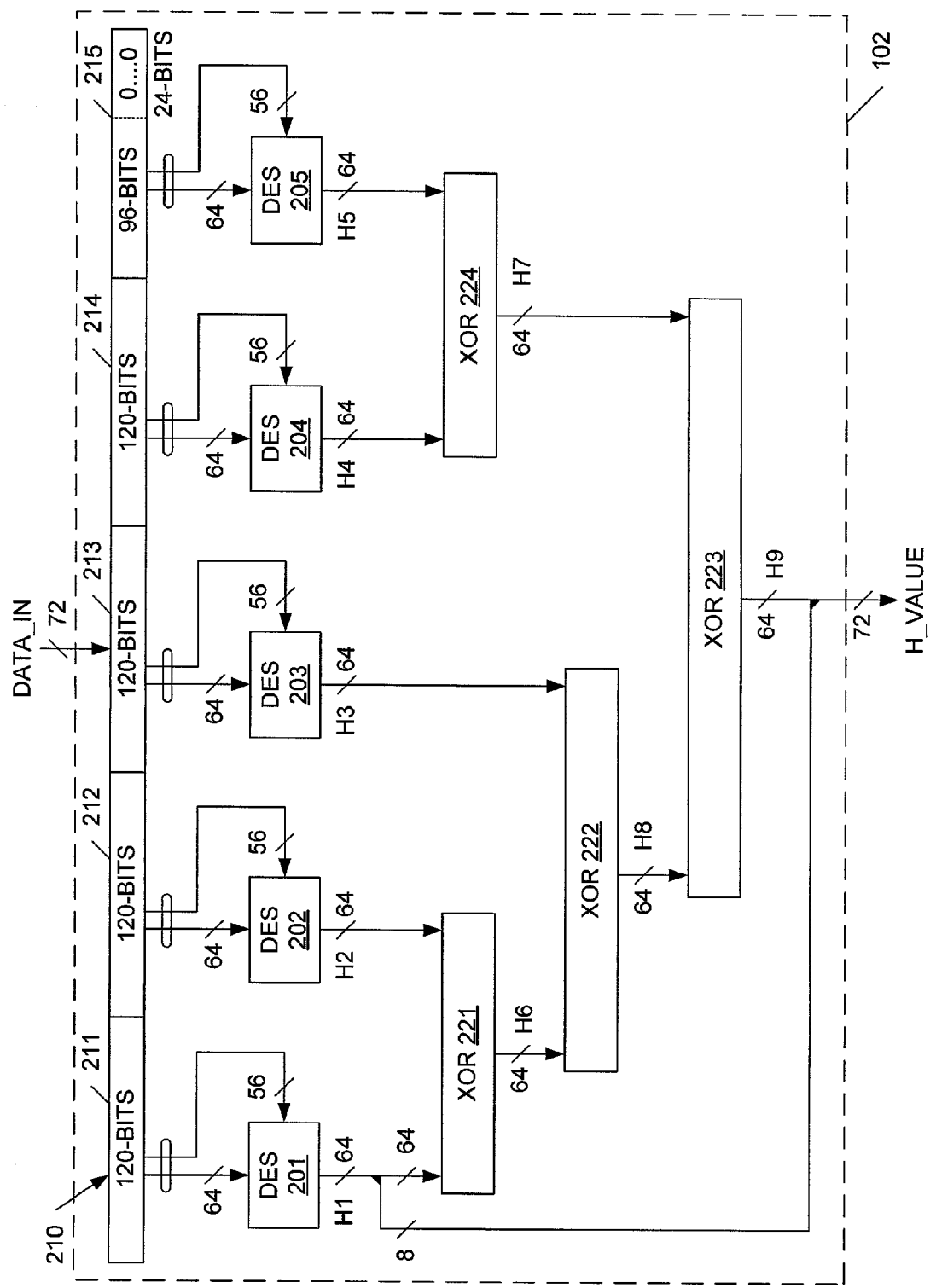
FIG. 2 is a block diagram of a hardware hashing circuit located on the IC chip of FIG. 1, configured to receive a 576-bit input character string, in accordance with one embodiment of the present invention.

FIG. 2 is a block diagram of hardware hashing circuit 102, configured to receive a 576-bit input character string, in accordance with one embodiment of the present invention (i.e., configuration bits have a value of "11"). Hardware hashing circuit 102 includes Data Encryption Standard (DES) blocks 201–205, input register 210, and exclusive OR blocks 221–224. Input register 210 includes five smaller registers 211–215, each having a width of 120-bits. Eight consecutive 72-bit STRING_IN values are loaded (e.g., shifted) into input register 210 in the 576-bit configuration of FIG. 2. In the described embodiment, the first 72-bit STRING_IN value is loaded into bit locations [119:48] of register 211; the second 72-bit STRING_IN value is loaded into bit locations [47:0] of register 211 and bit locations [119:96] of register 212; the third 72-bit STRING_IN value is loaded into bit locations [95:24] of register 212; the fourth 72-bit STRING_IN value is loaded into bit locations [23:0] of register 212 and bit locations [119:72] of register 213; the fifth 72-bit STRING_IN value is loaded into bit locations [71:0] of register 213; the sixth 72-bit STRING_IN value is loaded into bit locations [119:48] of register 214; the seventh 72-bit STRING_IN value is loaded into bit locations [47:0] of register 214 and bit locations [119:96] of register 215; and the eighth 72-bit STRING_IN value is loaded into bit locations [95:24] of register 212. Bit locations [23:0] of register 215 are loaded with logic "0" values. In other embodiments, the eight 72-bit STRING_IN values and 24 logic "0" values can be loaded into register 210 in other manners.

Each of the 120-bit registers 211–215 is coupled to a corresponding one of DES blocks 201–205. Each of DES blocks 201–205 operates in accordance with the conventional Data Encryption Standard (DES). DES is a widely used method of data encryption, which applies a 56-bit key to a 64-bit block of data, in order to obtain a 64-bit block of encrypted data. DES is specified in the American National Standards Institute (ANSI) X3.93 and X3.106 standards, and in the Federal Information Processing Standards (FIPS) 46 and 81.

In the described embodiment, the 64-bits at bit locations [119:56] of each 120-bit register are applied to a data input bus of a corresponding DES block, and the 56-bits at bit locations [55:0] of each 120-bit register are applied to a key input bus of a corresponding DES block. For example, the 64-bits at bit locations [119:56] of 120-bit register 211 are applied to the input data bus of DES block 201, and the 56-bits at bit locations [55:0] of 120-bit register 211 are applied to the key input bus of DES block 201. In other embodiments, bits from registers 211–215 can be applied to DES blocks 201–205 in other manners.

In response to the data bits received from registers 211–215, DES blocks 201–205 provide 64-bit hashed output values H1–H5, respectively. The hashed output values H1 and H2 provided by DES blocks 201 and 202 are applied to exclusive OR block 221. Each of exclusive OR blocks 221–224 provides a logical exclusive OR function of the input values. Thus, exclusive OR block 221 provides a hashed output value H6, which is the logical exclusive OR of hashed output values H1 and H2. The hashed output values H4 and H5 provided by DES blocks 204 and 205 are applied to exclusive OR block 224, thereby creating hashed output value H7, which is the logical exclusive OR of hashed output values H4 and H5. The hashed output values H3 and H6 are applied to exclusive OR block 222. In response, exclusive OR block 222 provides a hashed output value H8, which is the logical exclusive OR of hashed output values H3 and H6. Finally, the hashed output values H7 and H8 are applied to exclusive OR block 223. In response, exclusive OR block 223 provides a hashed output value H9, which is the logical exclusive OR of hashed output values H7 and H8.

In the described embodiment, the first 8-bits of hashed output value H1 are concatenated with the 64-bits of hashed output value H9, thereby creating 72-bit hashed output value, H_VALUE. In other embodiments, the 72-bit hashed output value H_VALUE can be created in other manners from the hashed data values H1–H5.

Figure 3:
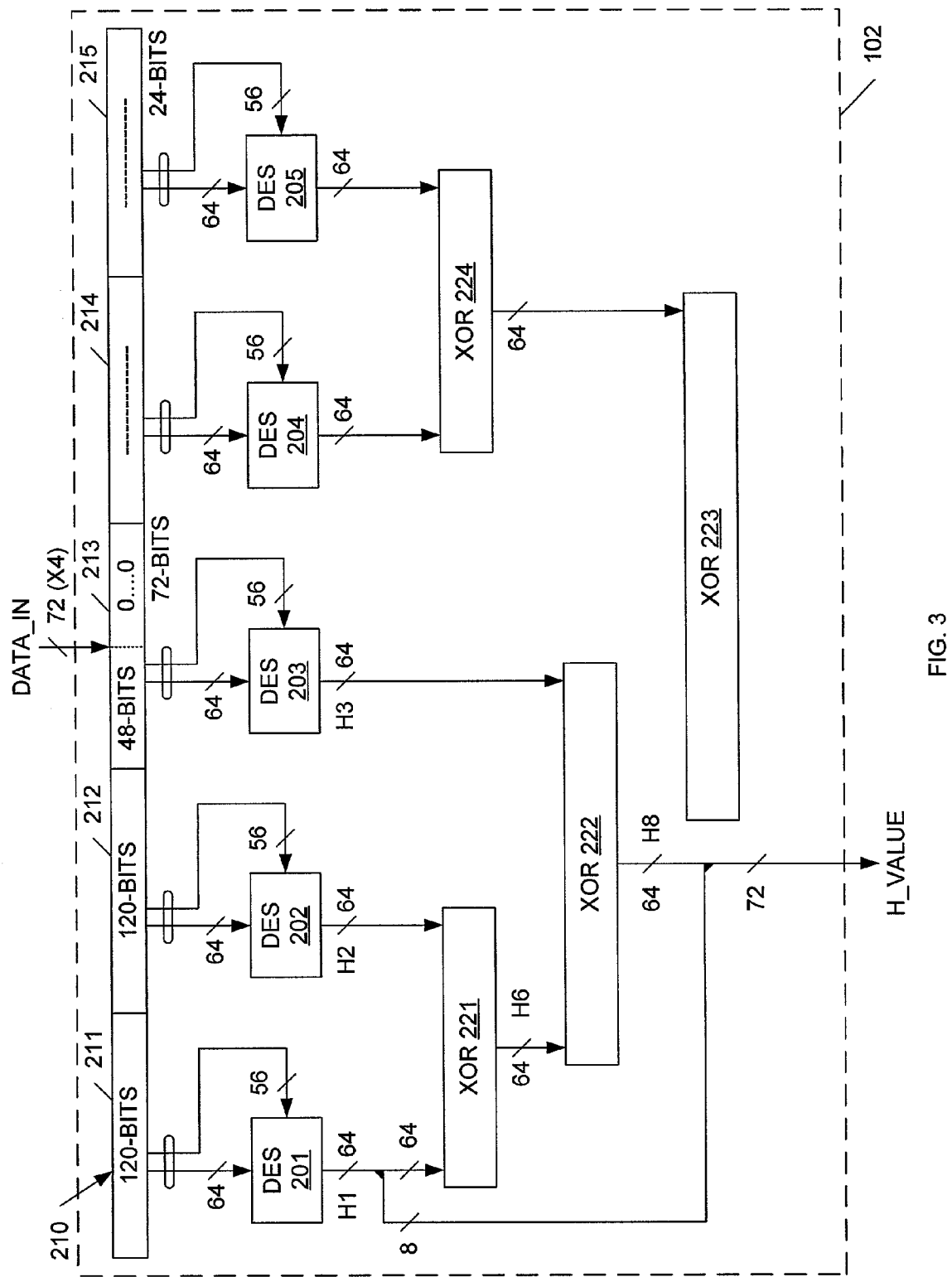
FIG. 3 is a block diagram of the hardware hashing circuit of FIG. 1, configured to receive a 288-bit input character string, in accordance with one embodiment of the present invention.

FIG. 3 is a block diagram of hardware hashing circuit 102, configured to receive a 288-bit input character string, in accordance with one embodiment of the present invention (i.e., configuration bits have a value of "10"). Hardware hashing circuit 102 includes the same elements described above in connection with FIG. 2. However, these elements are configured in a different manner in FIG. 3, in response to the configuration bits stored in register 103 (or provided externally). More specifically, four consecutive 72-bit STRING_IN values are loaded into input register 210 in the 288-bit configuration of FIG. 3. In the described embodiment, the first 72-bit STRING_IN value is loaded into bit locations [119:48] of register 211; the second 72-bit STRING_IN value is loaded into bit locations [47:0] of register 211 and bit locations [119:96] of register 212; the third 72-bit STRING_IN value is loaded into bit locations [95:24] of register 212; and the fourth 72-bit STRING_IN value is loaded into bit locations [23:0] of register 212 and bit locations [119:72] of register 213. Bit locations [71:0] of register 213 are loaded with logic "0" values. In other embodiments, the four 72-bit STRING_IN values and 72 logic "0" values can be loaded into register 210 in other manners.

Each of DES blocks 201–203 operates in accordance with the conventional Data Encryption Standard (DES) in the manner described above, thereby creating 64-bit hashed output values H1, H2 and H3, respectively. The hashed output values H1 and H2 are applied to exclusive OR block 221, thereby creating 64-bit hashed output value H6. The hashed output values H3 and H6 are applied to exclusive OR block 222, thereby creating hashed output value H8.

In the described embodiment, the first 8-bits of hashed output value H1 are concatenated with the 64-bits of hashed output value H8, thereby creating 72-bit hashed output value, H_VALUE. In other embodiments, the 72-bit hashed output value H_VALUE can be created in other manners from the hashed data values H1–H3. Note that registers 214 and 215 do not store any relevant data, and that exclusive OR blocks 223 and 224 are not used (i.e., are disconnected in response to the configuration bits) in this embodiment.

Figure 4:
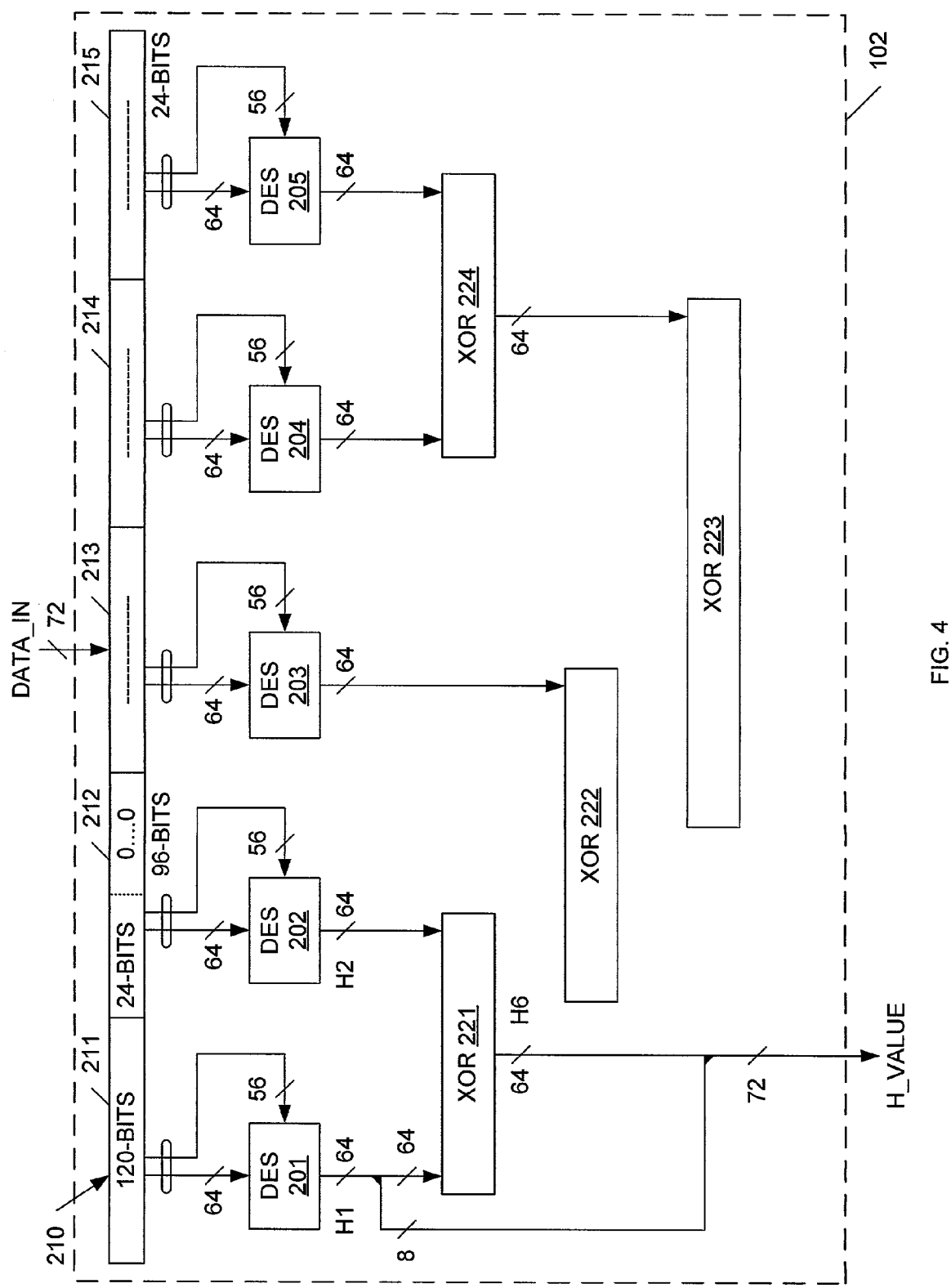
FIG. 4 is a block diagram of the hardware hashing circuit of FIG. 1, configured to receive a 144-bit input character string, in accordance with one embodiment of the present invention.

FIG. 4 is a block diagram of hardware hashing circuit 102, configured to receive a 144-bit input character string, in accordance with one embodiment of the present invention (i.e., configuration bits have a value of "01"). Hardware hashing circuit 102 includes the same elements described above in connection with FIGS. 2 and 3. However, these elements are configured in a different manner in FIG. 4, in response to the configuration bits stored in register 103 (or provided externally). More specifically, two consecutive 72-bit STRING_IN values are loaded into input register 210 in the 144-bit configuration of FIG. 4. In the described embodiment, the first 72-bit STRING_IN value is loaded into bit locations [119:48] of register 211, and the second 72-bit STRING_IN value is loaded into bit locations [47:0] of register 211 and bit locations [119:96] of register 212. Bit locations [95:0] of register 212 are loaded with logic "0" values. In other embodiments, the two 72-bit STRING_IN values and 96 logic "0" values can be loaded into register 210 in other manners.

Each of DES blocks 201–202 operates in accordance with the conventional Data Encryption Standard (DES) in the manner described above, thereby creating 64-bit hashed output values H1 and H2, respectively. The hashed output values H1 and H2 are applied to exclusive OR block 221, thereby creating 64-bit hashed output value H6. In the described embodiment, the first 8-bits of hashed output value Hi are concatenated with the 64-bits of hashed output value H6, thereby creating 72-bit hashed output value, H_VALUE. In other embodiments, the 72-bit hashed output value H_VALUE can be created in other manners from the hashed data values H1–H2. Note that registers 213–215 do not store any relevant data, and that exclusive OR blocks 222–224 are not used (i.e., are disconnected in response to the configuration bits) in this embodiment.

In the above-described manner, hardware hashing circuit 102 provides a 72-bit hashed output value H_VALUE to binary CAM array 101 as a comparison value. As described in more detail below, binary CAM array 101 is programmed to store a plurality of hashed values. In the described embodiment, binary CAM array 101 has a width of 72-bits and a depth of 128K (131,072) entries, such that binary CAM array 101 is capable of storing 128K 72-bit hashed values. Binary CAM array 101 can have other depths and widths in other embodiments.

If the hashed output value H_VALUE matches an entry of binary CAM array 101, then binary CAM array 101 will provide an index value (INDEX), which points to a location in SRAM 110. This location in SRAM 110 stores information (e.g., routing information) that is associated with the original input character string, STRING_IN. Upon receiving the INDEX value, SRAM 110 provides this information in the form of output data, DATA_OUT. In the embodiment illustrated in FIG. 1, the DATA_OUT value is provided directly to NPU 120. NPU 120 uses the DATA_OUT value in a manner known to those of ordinary skill in the art (i.e., to control the routing of an associated packet). However, other system configurations can be implemented in accordance with other embodiments of the present invention.

Figure 5A:
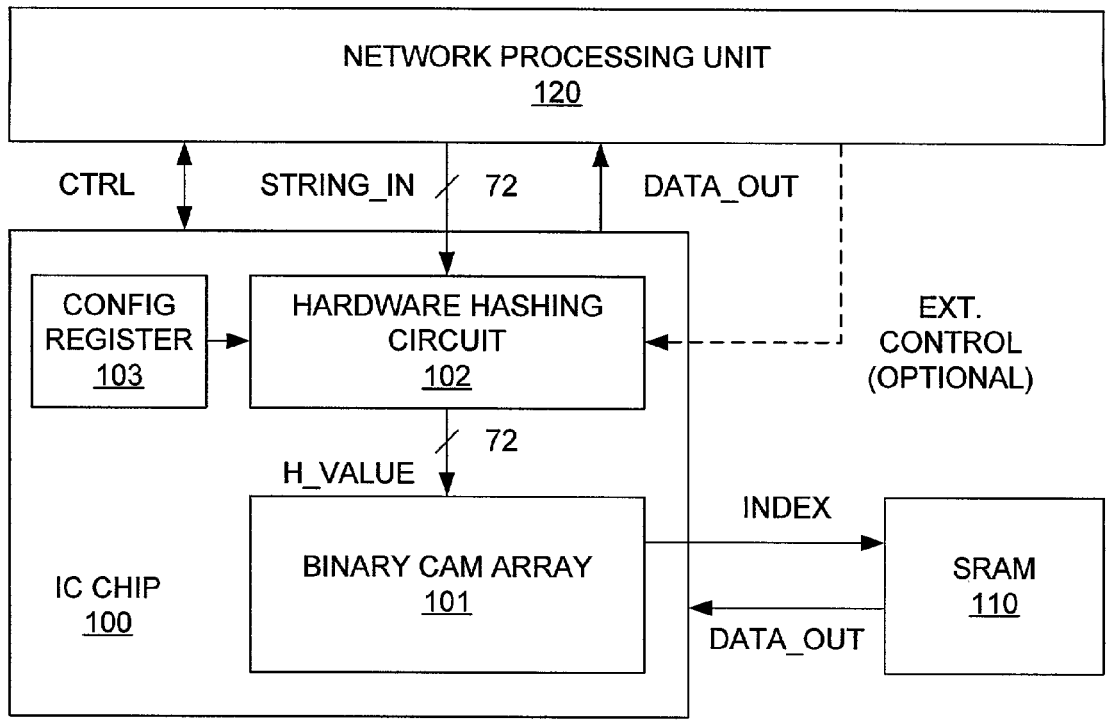
FIGS. 5A and 5B are block diagrams that illustrate variations of the system of FIG. 1, in accordance with alternate embodiments of the present invention.

FIG. 5A is a block diagram illustrating an alternate system configuration, in which SRAM 110 returns the DATA_OUT value to IC chip 100. In this embodiment, the DATA_OUT value is provided to NPU 120 via the interface of IC chip 100. The DATA_OUT value may be routed from IC chip 100 to NPU 120 using the same bus on which the STRING_IN value is received. In one variation, the INDEX value can be routed to NPU 120, along with the DATA OUT value.

Figure 5B:
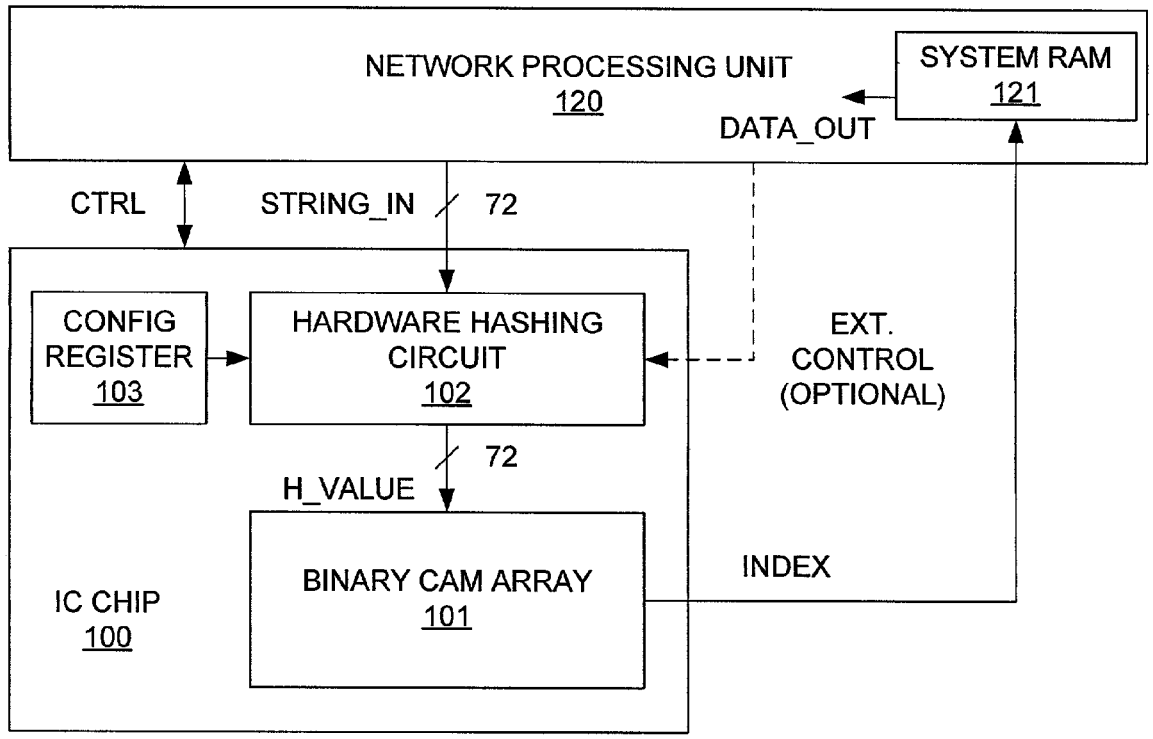

FIG. 5B is a block diagram illustrating another alternate system configuration, in which binary CAM array 101 is configured to provide the INDEX value directly to network processing unit 120, thereby eliminating SRAM 110. In this configuration, NPU 120 uses the INDEX value to lookup the corresponding DATA_OUT value in a system RAM 121 within NPU 120. Note that the INDEX value can be routed from IC chip 100 to NPU 120 using the same bus on which the STRING_IN value is received.

Figure 6:
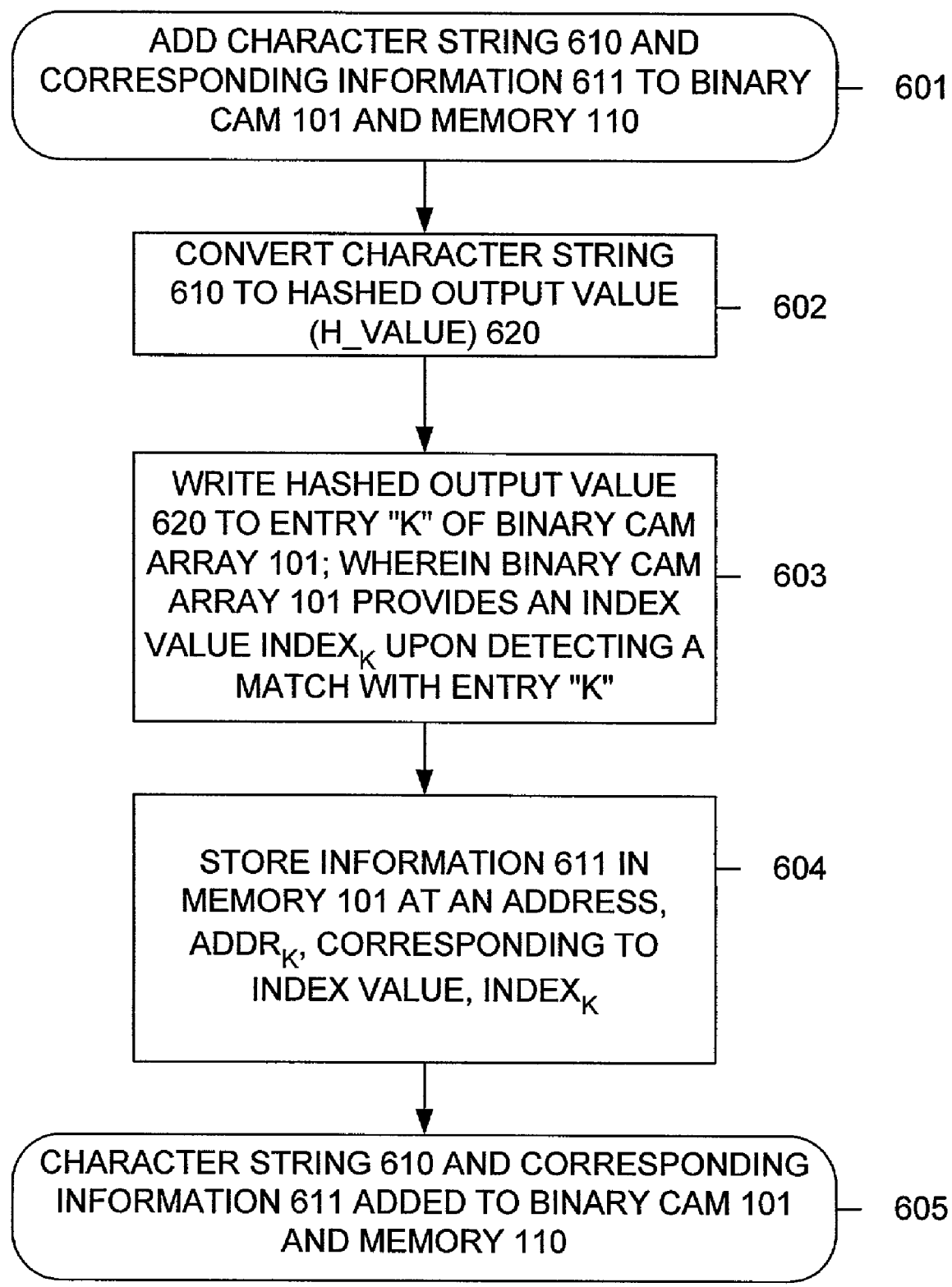
FIG. 6 is a flow diagram illustrating the addition of a character string and corresponding information to a binary CAM array and corresponding memory in accordance with one embodiment of the present invention.

FIG. 6 is a flow diagram illustrating the addition of a character string 610 and the corresponding information 611 to binary CAM array 101 and SRAM 110 in accordance with one embodiment of the present invention. The addition of character string 610 and the corresponding information 611 is initiated in Step 601. The character string 610 is converted to a hashed output value 620 by hardware hashing circuit 102 in the manner described above (Step 602). The hashed output value 620 is then written to an entry (i.e., entry "K", where K is a whole number from 0 to 131,071, inclusive) of binary CAM array 101 (Step 603). Note that if a hashed output value subsequently applied to binary CAM array 101 during a compare operation matches the hashed output value 620 stored in entry "K", then binary CAM array 101 will provide a corresponding output index value, INDEX$_K$ (Step 603). The information 611 corresponding to character string 610 is written to SRAM 110 at an address ADDR$_K$ corresponding with index value, INDEX$_K$ (Step 604). Thus, the index value INDEX$_K$ can be used to access the information 611 stored at address ADDR$_K$ of SRAM 110 during a subsequent compare operation. At this time, the character string 610 and the corresponding information 611 have been added to binary CAM array 101 and SRAM 110 (Step 605).

Figure 7:
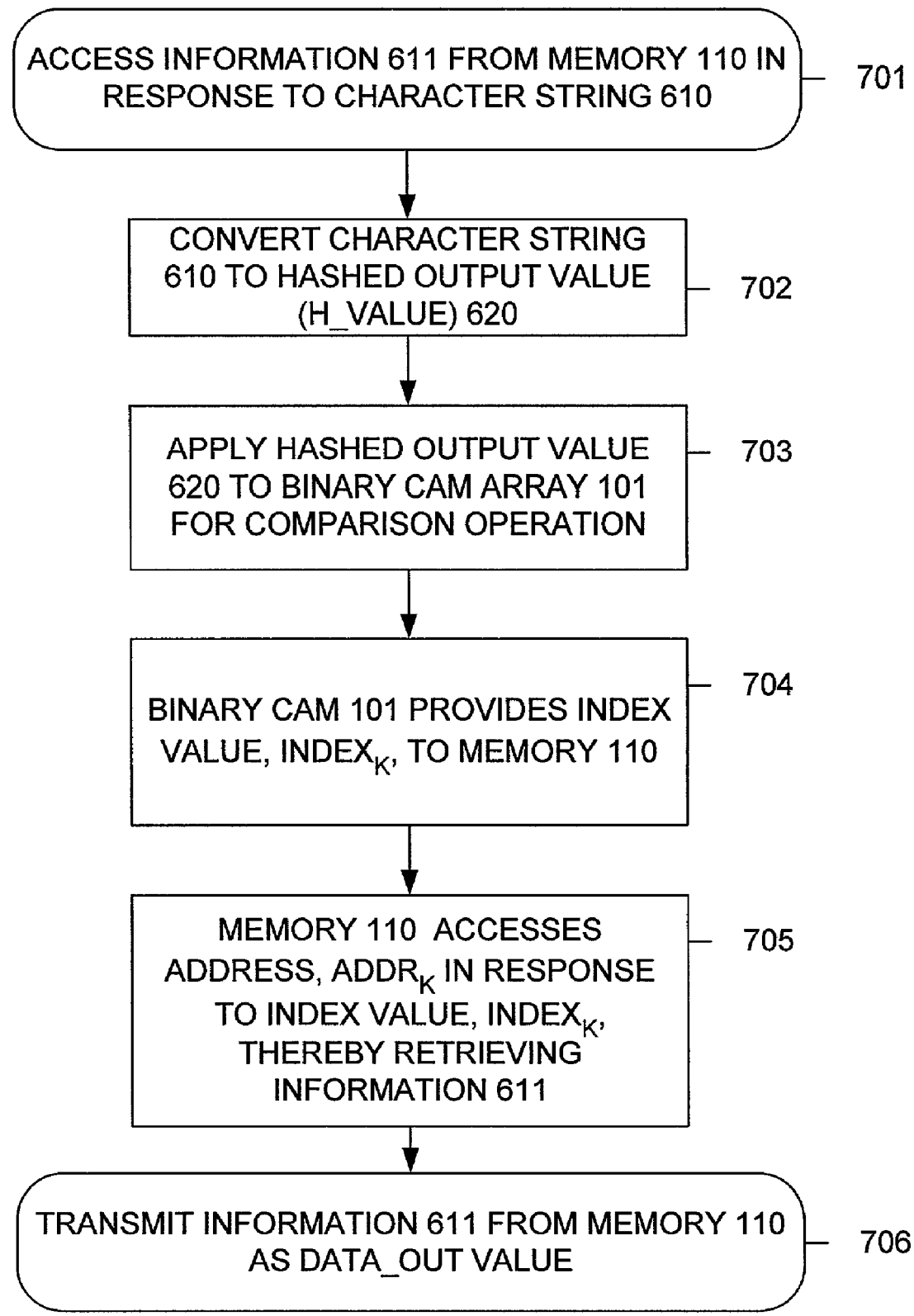
FIG. 7 is a flow diagram illustrating the accessing of information from a memory in response to a character string in accordance with one embodiment of the present invention.

FIG. 7 is a flow diagram illustrating the accessing of information 611 from SRAM 110 in response to character string 610 in accordance with one embodiment of the present invention. The access of information 611 is initiated in Step 701. Character string 610 is applied to hardware hashing circuit 102, which converts this character string 610 to hashed output value 620 in the manner described above (Step 702). The associated hashed output value 620 is applied to binary CAM array 101, thereby comparing the hashed output value 620 with the hashed values previously stored in binary CAM array 101 (Step 703). Because the hashed output value 620 was previously written to binary CAM array 101, a match exists in the present example. As a result, binary CAM array 101 provides the associated index value, INDEX$_K$, to SRAM 110 (Step 704).

Binary CAM array 101 uses the INDEX$_K$ value to access the information 611 stored at address ADDR$_K$ of SRAM 110 (Step 705). In one embodiment, the INDEX$_K$ value is equal to the address value ADDR$_K$. In another embodiment, the INDEX$_K$ value is mapped to the address value ADDR$_K$. Note that the use of hashed values means that only exact matches may be performed within binary CAM array 101. The information 611 retrieved from SRAM 110 is then provided by SRAM 110 as the DATA_OUT value (Step 706).

Note that the hashing function implemented by IC chip 100 may result in collisions, wherein different character strings (STRING_IN) may produce the same hashed output value (H_VALUE). If collisions do exist, hardware hashing circuit 102 may be modified to provide a longer hashed output value, thereby reducing the possibility of a collision. For example, rather than creating a 72-bit hashed output value, hardware hashing circuit 102 may be modified to provide a 144-bit hashed output value. Such a configuration would be supported by configuration register 103. In this case, the 144-bit hashed output value (H_VALUE) would be stored in two entries of binary CAM array 101. As a result, the effective depth of binary CAM array 101 would be reduced from 128K entries to 64K entries. Moreover, each comparison would require two compare operations, one for each of the two entries in binary CAM array 101. This method can further be extended to longer hashed output values, as necessary.

Collisions may be so rare that they are ignorable. Otherwise, collisions can be handled by a conventional hash collision resolution method at some small cost in NPU time and memory.

Figure 8A:
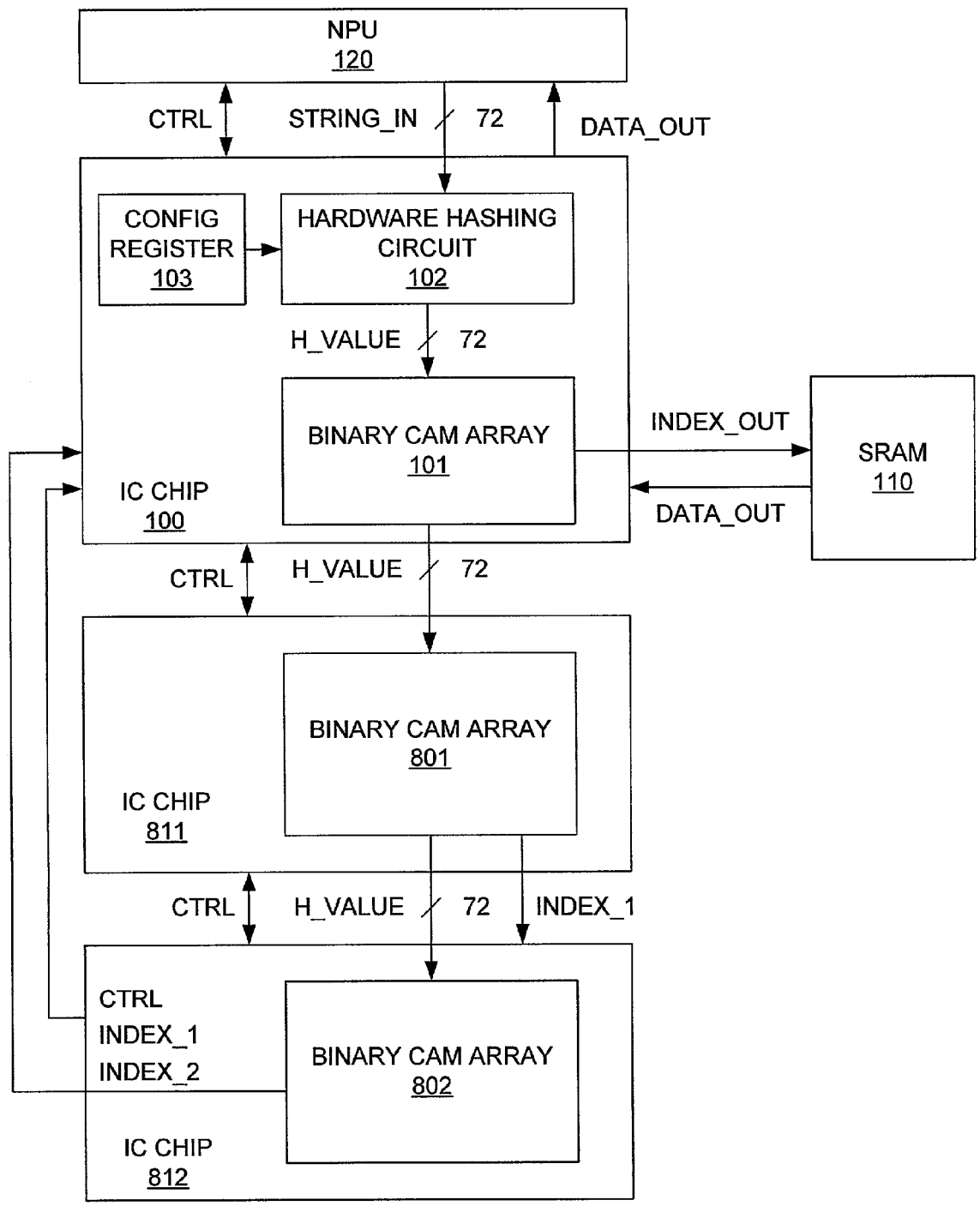
FIGS. 8A and 8B are block diagrams illustrating variations of the present invention, wherein the IC chip of FIG. 1 provides a hashed output value for use with a plurality of binary CAM arrays.

FIG. 8A is a block diagram illustrating one variation of the present invention, wherein IC chip 100 provides the hashed output value (H_VALUE) for use with a plurality of binary CAM arrays 801–802, in addition to binary CAM array 101. Binary CAM arrays 801 and 802 are located on separate IC chips 811 and 812, respectively. The hashed output value H_VALUE provided by hardware hashing circuit 102 is routed to binary CAM arrays 101, 801 and 802 in a daisy-chained manner. The control values CTRL are also routed to IC chips 100, 811 and 812 in a daisy-chained manner. In response, binary CAM arrays 801 and 802 provide index values INDEX_1 and INDEX_2, respectively. IC chip 811 provides the INDEX_1 value and associated control values, CTRL, to IC chip 812. IC chip 812 provides the INDEX_1 value, the INDEX_2 value, and associated control values, CTRL, to IC chip 100. In response, binary CAM array 101 provides an output index value INDEX OUT, which takes into account the results from binary CAM arrays 101, 801 and 802. Although three binary CAM arrays are connected in FIG. 8A, it is understood that other numbers of binary CAM arrays can be connected in other embodiments.

The INDEX_OUT value is provided to SRAM 110, which provides the associated DATA_OUT value to IC chip 100. IC chip 100, in turn, provides the DATA_OUT value to NPU 120. The INDEX_OUT value can also be routed to NPU

120, along with the DATA_OUT value. The INDEX_OUT value can be processed in any one of the manners described in connection with FIGS. 1, 5A and 5B.

Figure 8B:
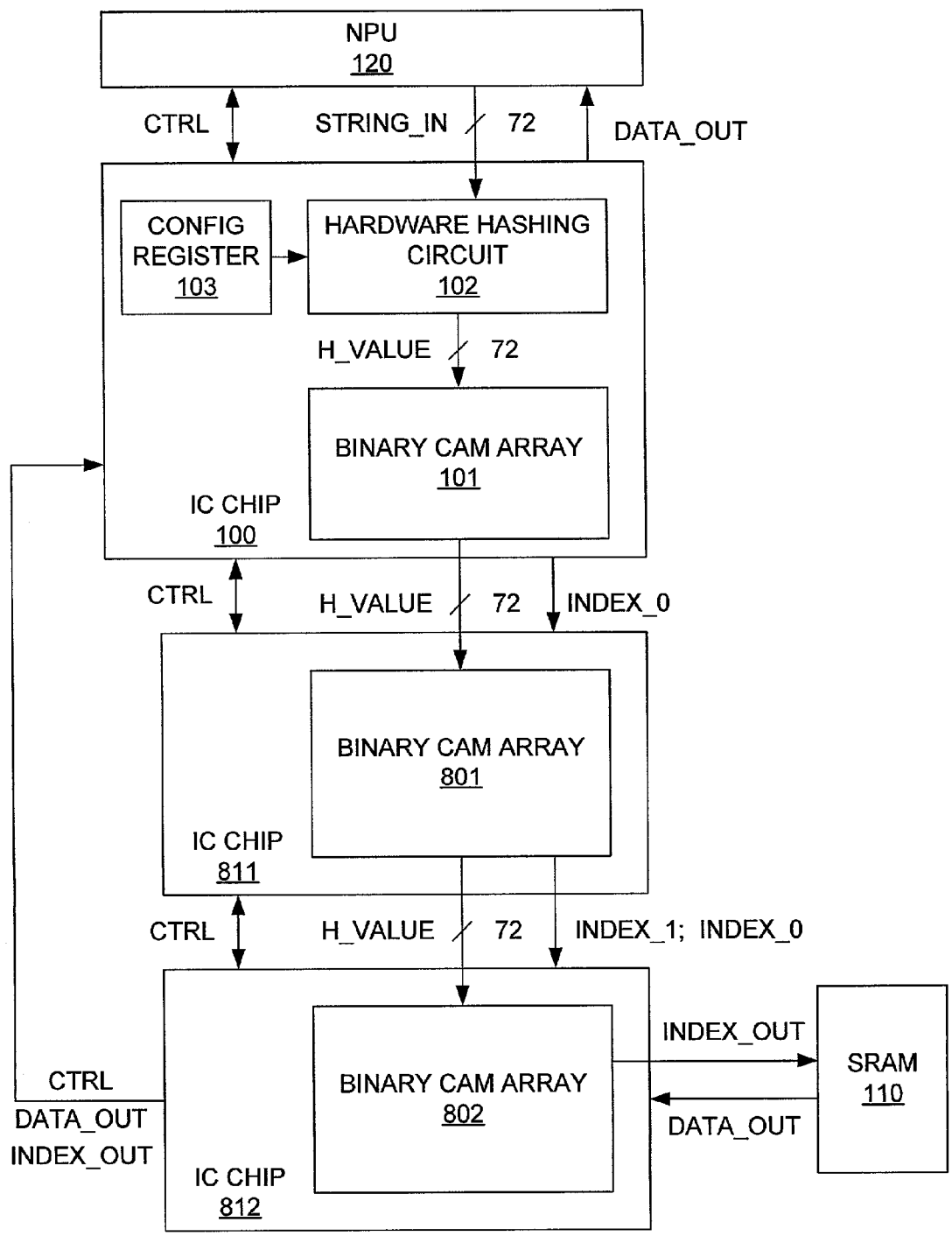

FIG. 8B is a block diagram illustrating a variation of the system of FIG. 8A. Similar elements in FIGS. 8A and 8B are labeled with similar reference numbers. Thus, hardware hashing circuit 102 provides the hashed output value (H_VALUE) to binary CAM arrays 101, 801 and 802 in a daisy-chained manner. Binary CAM arrays 101 and 801 provide index values INDEX_0 and INDEX_1, respectively, in response to the hashed output value, H_VALUE. IC chip 100 provides index value INDEX_0 and associated control values CTRL to IC chip 811. IC chip 811 provides the INDEX_0 value, the INDEX_1 value and associated control values CTRL to IC chip 812. In response, binary CAM array 802 provides an output index value INDEX_OUT, which takes into account the results from binary CAM arrays 101, 801 and 802. Although three binary CAM arrays are connected in FIG. 8B, it is understood that other numbers of binary CAM arrays can be connected in other embodiments.

The INDEX_OUT value is provided to SRAM 110, which provides the associated DATA_OUT value to IC chip 812. IC chip 812 provides the DATA_OUT value and associated control values, CTRL, to IC chip 100, which in turn, provides the DATA_OUT value to NPU 120. The INDEX_OUT value can also be routed to NPU 120, along with the DATA OUT value. The INDEX_OUT value can be processed in any one of the manners described in connection with FIGS. 1, 5A and 5B.

Figure 9A:
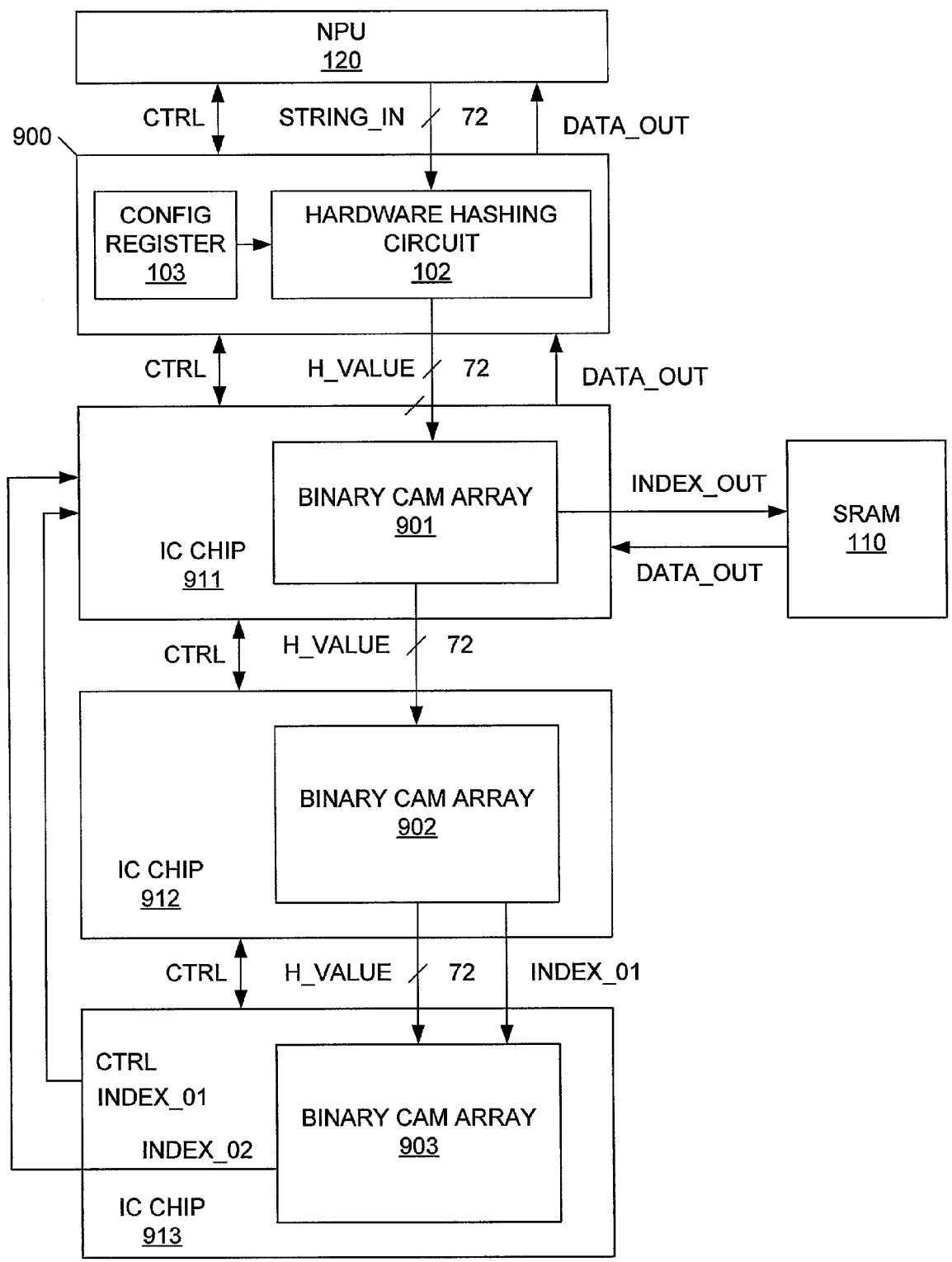
FIGS. 9A and 9B are block diagrams illustrating other variations of the present invention, wherein an IC chip that includes a hardware hashing circuit provides a hashed output value for use with a plurality of binary CAM arrays.

FIG. 9A is a block diagram illustrating another variation of the present invention, wherein an IC chip 900 that includes hardware hashing circuit 102 and configuration register 103 provides the hashed output value (H_VALUE) for use with a plurality of IC chips 911–913 that include binary CAM arrays 901–903, respectively. The hashed output value H_VALUE provided by hardware hashing circuit 102 is routed to binary CAM arrays 901–903 in a daisy-chained manner. Binary CAM arrays 902 and 903 provide index values INDEX_01 and INDEX_02, respectively, in response to the hashed output value, H_VALUE.

IC chip 912 provides the INDEX_01 value and associated control values, CTRL, to IC chip 913. IC chip 913 provides the INDEX_01 value, the INDEX_02 value, and associated control values, CTRL, to IC chip 911. In response, binary CAM array 901 provides an output index value INDEX_OUT, which takes into account the results from binary CAM arrays 901, 902 and 903. Although three binary CAM arrays are connected in FIG. 9A, it is understood that other numbers of binary CAM arrays can be connected in other embodiments.

The INDEX_OUT value is provided to SRAM 110, which provides the associated DATA_OUT value to IC chip 911. IC chip 911 provides the DATA_OUT value IC chip 900, which in turn, provides the DATA OUT value to NPU 120. The INDEX OUT value can also be routed to NPU 120, along with the DATA_OUT value. The INDEX OUT value can be processed in any one of the manners described in connection with FIGS. 1, 5A and 5B.

Figure 9B:
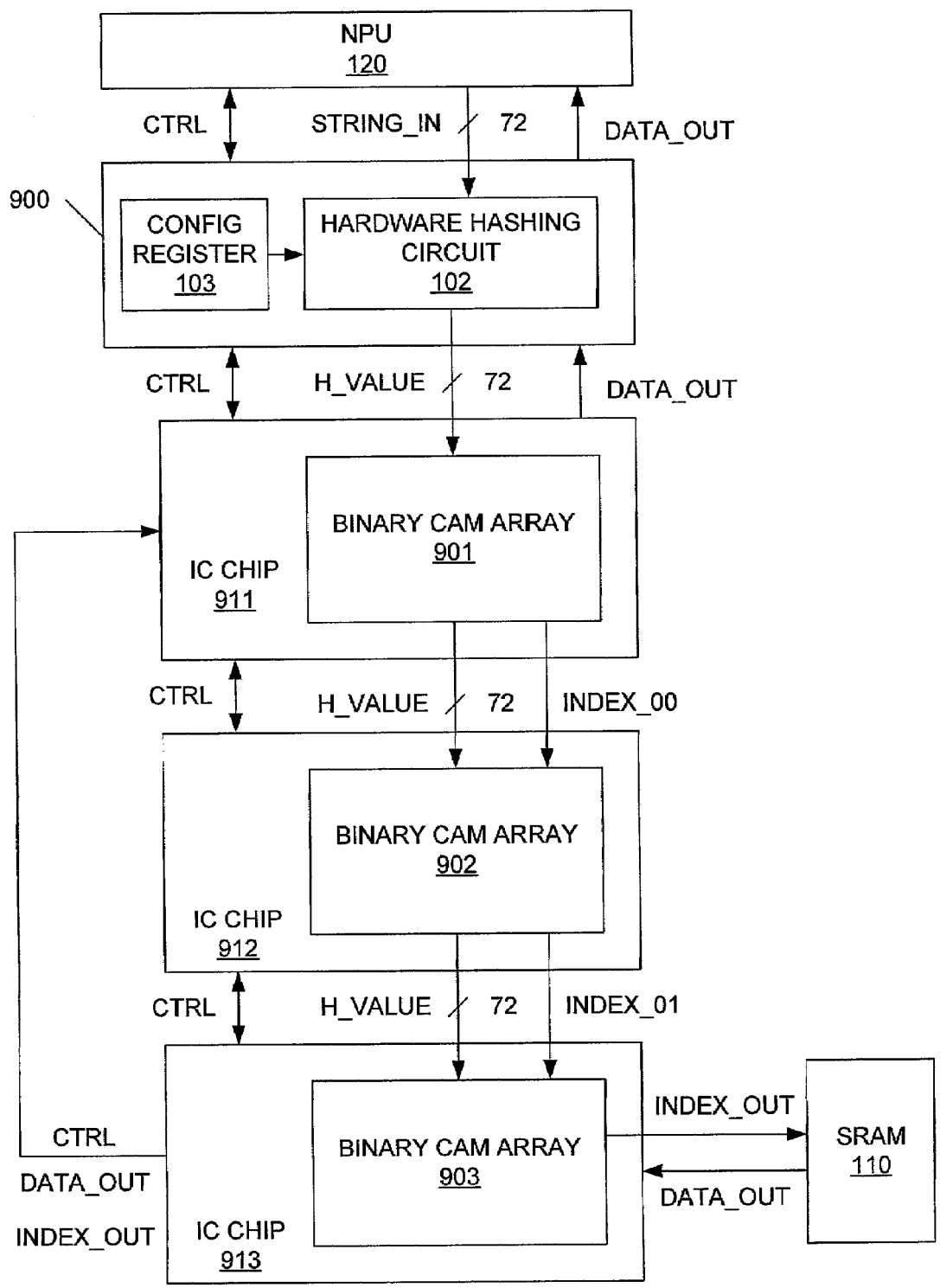

FIG. 9B is a block diagram illustrating a variation of the system of FIG. 9A. Similar elements in FIGS. 9A and 9B are labeled with similar reference numbers. Thus, hardware hashing circuit 102 provides the hashed output value (H_VALUE) to binary CAM arrays 901, 902 and 903 in a daisy-chained manner. Binary CAM arrays 901 and 902 provide index values INDEX_00 and INDEX_01, respectively, in response to the hashed output value, H_VALUE. IC chip 911 provides index value INDEX_00 and associated control values CTRL to IC chip 912. IC chip 912 provides the INDEX_00 value, the INDEX_01 value and associated control values CTRL to IC chip 913. In response, binary CAM array 903 provides an output index value INDEX_OUT, which takes into account the results from binary CAM arrays 901, 902 and 903. Although three binary CAM arrays are connected in FIG. 9B, it is understood that other numbers of binary CAM arrays can be connected in other embodiments.

The INDEX_OUT value is provided to SRAM 110, which provides the associated DATA_OUT value to IC chip 913. IC chip 913 provides the DATA_OUT value and associated control values, CTRL, to IC chip 911. IC chip 911 provides the DATA_OUT value to IC chip 900, which in turn, provides the DATA_OUT value to NPU 120. The INDEX_OUT value can also be routed to NPU 120, along with the DATA_OUT value. The INDEX_OUT value can be processed in any one of the manners described in connection with FIGS. 1, 5A and 5B.

The present invention advantageously increases the effective width of binary CAM array 101, without requiring a large amount of additional hardware. Moreover, IC chip 100 enables information in SRAM 110 to be retrieved with minimal search time. IC chip 100 does not require the received character string to be parsed in order to retrieve information from SRAM 110. Moreover, IC chip 100 does not require processing to search a binary tree in a plurality of steps to retrieve information from SRAM 110.

Although hardware hashing circuit 102 has been described using DES encryption, it is understood that other hardware hashing circuitry can be used to create the hashed output value H_VALUE. For example, hardware hashing circuit 102 can implement one or more conventional hashing methods, including, but not limited to: a division-remainder method, a folding method, a radix transformation, or digit rearrangement.

Although the invention has been described in connection with several embodiments, it is understood that this invention is not limited to the embodiments disclosed, but is capable of various modifications, which would be apparent to a person skilled in the art. Thus, the invention is limited only by the following claims.

The invention claimed is:

1. An integrated circuit chip comprising:
   a port for receiving a character string;
   a hardware hashing circuit configured to perform a hashing function on the character string, thereby creating a hashed output value, wherein the hardware hashing circuit is configured in response to a length of the character string, wherein the hardware hashing circuit comprises a plurality of Data Encryption Standard (DES) circuits and a plurality of exclusive OR circuits coupled to the DES circuits; and
   a content addressable memory (CAM) array coupled to receive the hashed output value, the CAM array providing an index value in response to the hashed output value if the hashed output value matches an entry of the CAM array.

2. The integrated circuit chip of claim 1, further comprising means for selectively connecting the DES circuits and the exclusive OR circuits in response to the length of the character string.

3. A method of implementing a content addressable memory (CAM) system comprising:
   receiving a character string having a first length on a port;
   storing the received character string in an input register, wherein the input register is wider than the port;

configuring a hardware hashing circuit in response to the first length of the character string;

providing the character string from the input register to the hardware hashing circuit;

hashing the character string in the hardware hashing circuit, thereby creating a hashed output value having a second length, shorter than the first length;

comparing the hashed output value with hashed values stored in a content addressable memory (CAM) array;

providing an index value with the CAM array in response to the hashed output value if the hashed output value matches one of the hashed values stored in the CAM array; and retrieving information associated with the character string from a memory in response to the index value.

4. The method of claim 3, further comprising:

providing one or more configuration bits representative of the first length to the hardware hashing circuit; and configuring the hardware hashing circuit in response to the one or more configuration bits.

5. The method of claim 4, further comprising storing the one or more configuration bits in a configuration register.

6. The method of claim 3, further comprising loading the character string into a register in the hardware hashing circuit over a plurality of cycles.

7. The method of claim 3, further comprising hashing the character string in accordance with the Data Encryption Standard (DES).

8. The method of claim 3, wherein the step of hashing is performed in response to all bits of the character string.

9. An integrated circuit chip comprising:

a port for receiving a character string;

a hardware hashing circuit configured to perform a hashing function on the character string, thereby creating a hashed output value, wherein the hardware hashing circuit is configured in response to a length of the character string;

a content addressable memory (CAM) array coupled to receive the hashed output value, the CAM array providing an index value in response to the hashed output value if the hashed output value matches an entry of the CAM array; and an input register configured to receive the character string from the port and provide the character string to the hardware hashing circuit, wherein the input register is wider than the port.

10. The integrated circuit chip of claim 9, further comprising a configuration bus for providing one or more configuration bits representative of the length of the character string to the hardware hashing circuit, wherein the hardware hashing circuit is configured in response to the one or more configuration bits.

11. The integrated circuit chip of claim 10, further comprising a configuration register configured to store the one or more configuration bits.

12. The integrated circuit chip of claim 9, further comprising a memory coupled to receive the index value from the CAM array, wherein the memory is configured to store information associated with the character string at a location associated with the index value.

13. The integrated circuit chip of claim 12, wherein the memory is configured to provide the information in response to the index value.

14. The integrated circuit chip of claim 9, wherein the CAM array is a binary CAM array.

15. The integrated circuit chip of claim 9, wherein the hardware hashing circuit comprises a plurality of Data Encryption Standard (DES) circuits.

16. The integrated circuit chip of claim 9, wherein the hardware hashing circuit is configured to operate on all bits of the character string to provide the hashed output value, wherein the hashed output value is shorter then the character string.

17. The integrated circuit chip of claim 9, wherein the input register is configured to store the character string in a manner identified by the length of the character string.

18. The integrated circuit chip of claim 9, the input register is configured to store one or more predetermined values if the length of the character string is insufficient to fill the input register.

19. The integrated circuit chip of claim 9, wherein the input register has a width of M bits, and is logically divided into a plurality of N-bit registers, wherein N is less than M, the integrated circuit chip further comprising:

a plurality of circuit blocks, each coupled to a corresponding one of the N-bit registers, and each configured to provide a hashed value in response to contents of the corresponding N-bit register; and circuitry for combining the hashed values provided by the plurality of circuit blocks to create the hashed output value.

20. The integrated circuit chip of claim 19, wherein N is equal to 120 and each of the circuit blocks comprises a Data Encryption Standard (DES) circuit.

21. The integrated circuit chip of claim 19, further comprising means for enabling all of the circuit blocks if the length of the character string is equal to a maximum character string length.

22. The integrated circuit chip of claim 10, further comprising means for disabling one or more of the circuit blocks if the length of the character string is less than a maximum character string length.

23. The integrated circuit chip of claim 22, further comprising means for disabling a portion of the circuitry for combining if the length of the character string is less than the maximum character string length.

24. The integrated circuit chip of claim 19, further comprising means for disabling a portion of the circuitry for combining if the length of the character string is less than a maximum character string length.

25. The integrated circuit chip of claim 19, wherein the circuitry for combining is configured to provide a hashed output value having a fixed width, regardless of the length of the character string.

26. An integrated circuit chip comprising:

a port for receiving a character string;

a hardware hashing circuit configured to perform a hashing function on the character string, thereby creating a hashed output value, wherein the hardware hashing circuit is configured in response to a length of the character string;

a content addressable memory (CAM) array coupled to receive the hashed output value, the CAM array providing an index value in response to the hashed output value if the hashed output value matches an entry of the CAM array; and means for bypassing the hardware hashing circuit if the length of the character string has a minimum character string length.

27. The integrated circuit chip of claim 9, wherein a width of the hashed output value is equal to a width of the CAM array.

* * * * *